United States Patent
Loewen

(10) Patent No.: US 11,448,264 B2
(45) Date of Patent: Sep. 20, 2022

(54) COUPLER FOR INTERCONNECTING EXTERNALLY SPLINED POWER TAKE OFF SHAFT OF PRIME MOVER AND DRIVELINE OF IMPLEMENT

(71) Applicant: LIONFORGE INDUSTRIES INC., Ste. Genevieve (CA)

(72) Inventor: Jonathan S. Loewen, Ste. Genevieve (CA)

(73) Assignee: Lionforge Industries Inc.

( * ) Notice: Subject to any disclaimer, the term of this patent is extended or adjusted under 35 U.S.C. 154(b) by 119 days.

(21) Appl. No.: 17/104,875

(22) Filed: Nov. 25, 2020

(65) Prior Publication Data

US 2021/0156433 A1     May 27, 2021

Related U.S. Application Data

(60) Provisional application No. 62/939,950, filed on Nov. 25, 2019.

(51) Int. Cl.
  *F16D 1/08*     (2006.01)
  *F16D 1/112*     (2006.01)
  (Continued)

(52) U.S. Cl.
  CPC ............ *F16D 1/0847* (2013.01); *F16D 1/112* (2013.01); *F16D 1/116* (2013.01); *F16D 2001/103* (2013.01); *Y10T 403/7033* (2015.01)

(58) Field of Classification Search
  CPC ........ F16B 21/10; F16B 21/12; F16B 21/125; F16D 1/08; F16D 1/0829; F16D 1/0847;
  (Continued)

(56) References Cited

U.S. PATENT DOCUMENTS 2,489,864 A * 11/1949 Cravener .................. B66C 1/66
                                                                             403/325
4,508,263 A * 4/1985 Pedersen .............. G05D 23/023
                                                                             403/362

(Continued)

FOREIGN PATENT DOCUMENTS

| DE | 3723910 C1 * | 4/1988 | ........... F16D 1/0847 |
| FR | 638469 A * | 5/1928 | ............... F16D 1/08 |
| GB | 531095 A * | 12/1940 | ........... F16D 1/0847 |

*Primary Examiner* — Josh Skroupa
(74) *Attorney, Agent, or Firm* — Christopher J. Dynowski; Ryan W. Dupuis; Ade & Company Inc.

(57) ABSTRACT

A coupler for operatively interconnecting an externally splined power take off (PTO) shaft of a prime mover and a driveline of an implement that is configured to be driven by the prime mover so as to operate the implement comprises a smooth bore arranged to receive the splined PTO shaft and at least one spline-forming member which is movable in a radial direction relative to the bore between a working position for mating with a respective spline of the PTO shaft and a retracted position in which the spline-forming member is free of mating engagement with the splined shaft. There is also provided at least one locking member which is radially movable in a similar fashion to the spline-forming member between matingly-engaging and non-matingly engaging positions relative to a circumferential groove in the PTO shaft. The locking member is coincident with the spline-forming member circumferentially of the bore.

23 Claims, 10 Drawing Sheets

(51) Int. Cl.
*F16D 1/116* (2006.01)
*F16D 1/10* (2006.01)
(58) Field of Classification Search
CPC ........... Y10T 403/599; Y10T 403/7033; Y10T 403/7041; Y10T 403/7066; Y10T 403/7067
See application file for complete search history.

(56) References Cited

U.S. PATENT DOCUMENTS

| | | | | |
|---|---|---|---|---|
| 4,513,788 A | * | 4/1985 | Coker | ................ F16L 55/1157 403/362 |
| 5,957,615 A | * | 9/1999 | Orain | ..................... F16D 3/205 403/359.1 |

* cited by examiner

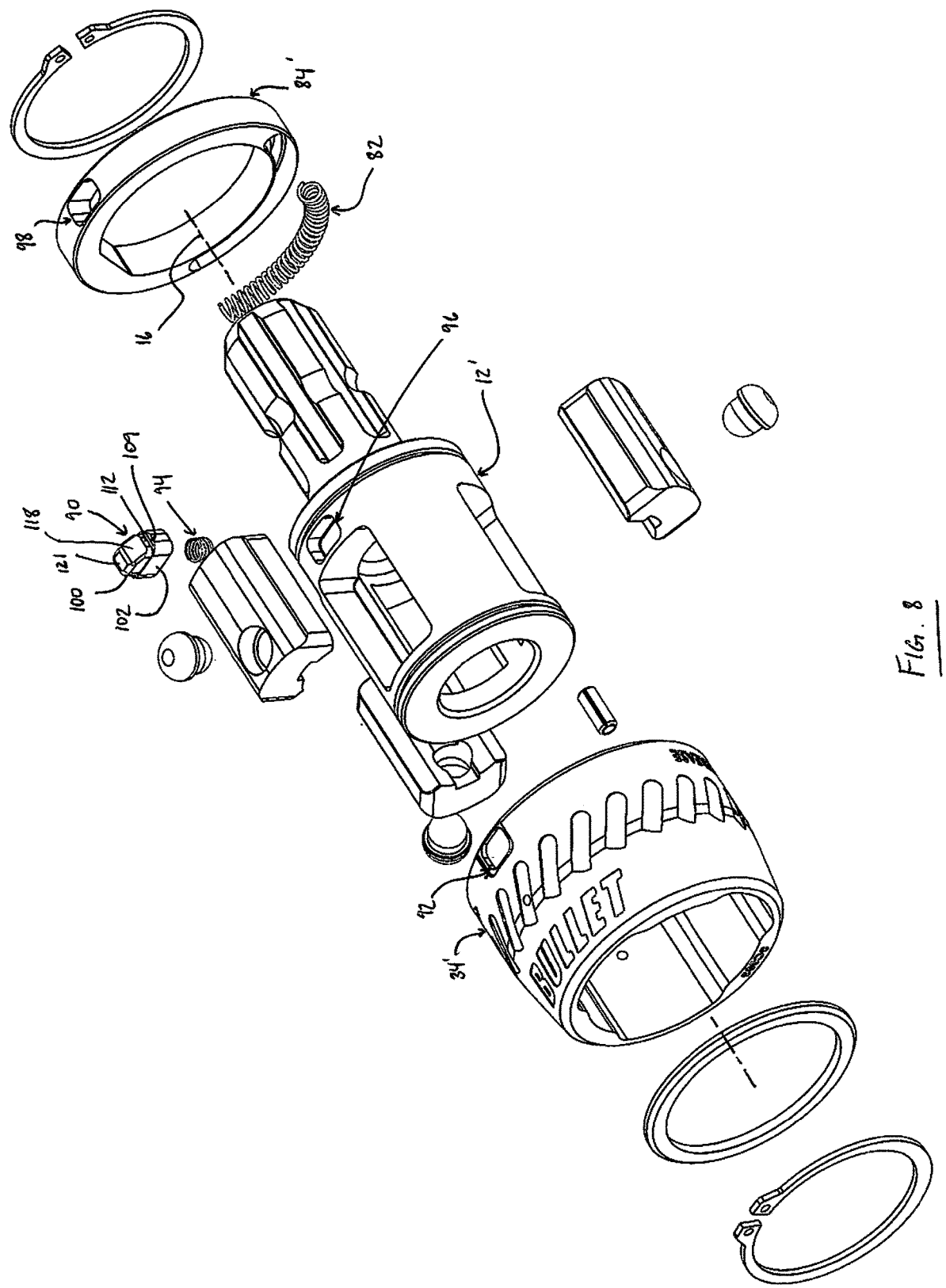

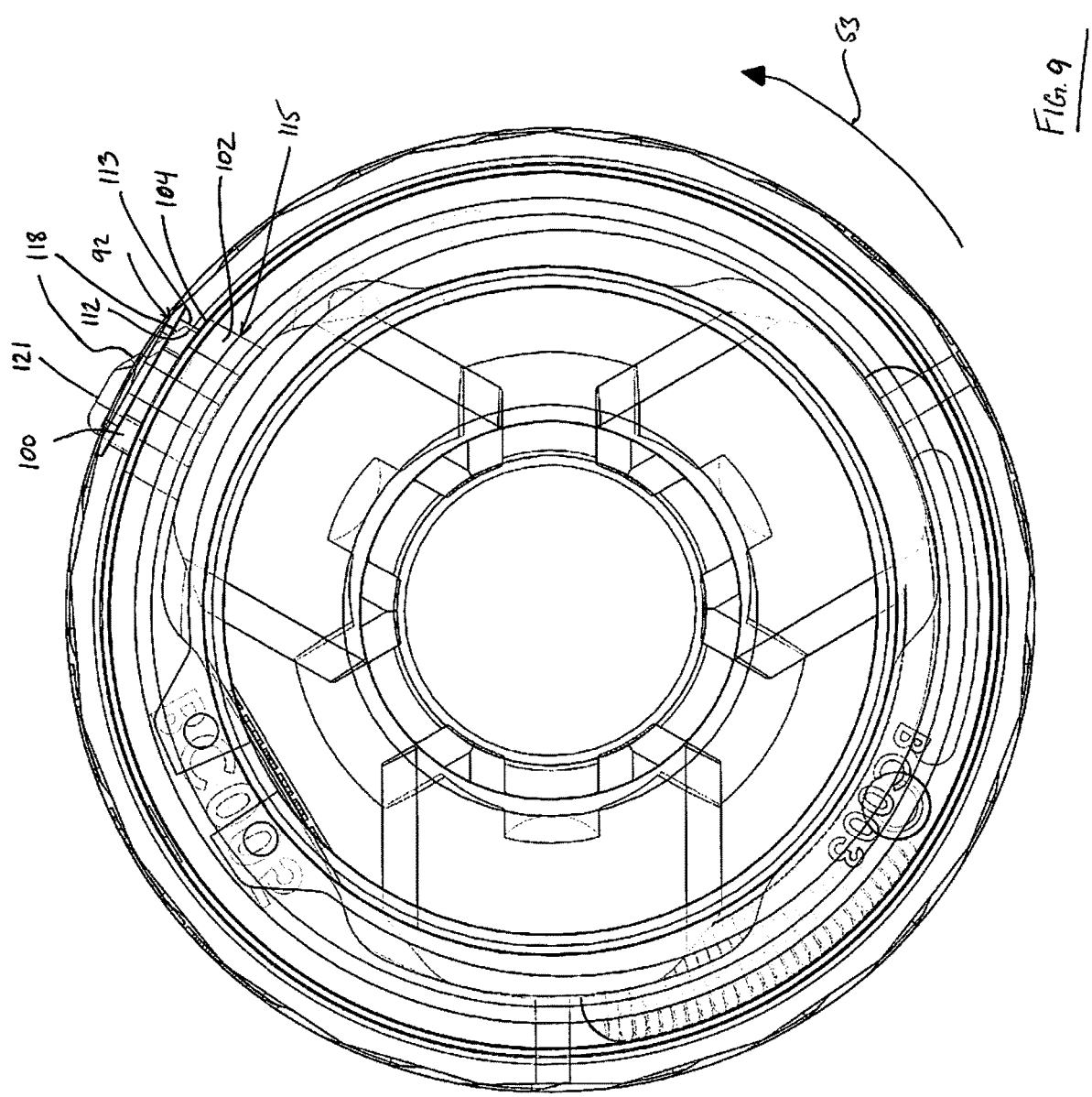

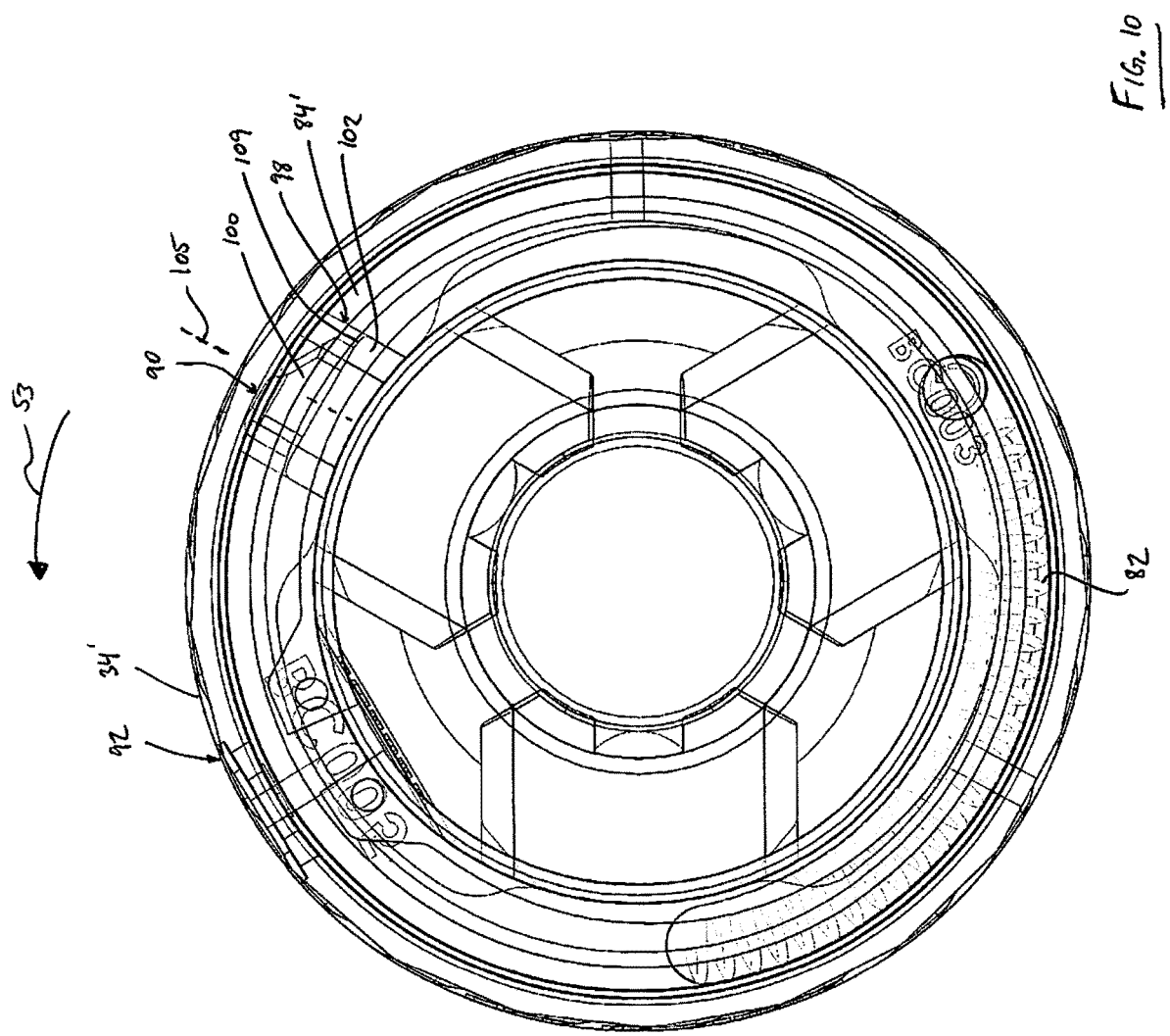

COUPLER FOR INTERCONNECTING EXTERNALLY SPLINED POWER TAKE OFF SHAFT OF PRIME MOVER AND DRIVELINE OF IMPLEMENT

This application claims the benefit under 35 U.S.C. 119(e) of U.S. Provisional Application Ser. No. 62/939,950 filed Nov. 25, 2019.

FIELD OF THE INVENTION

The present invention relates to a coupler device for operatively interconnecting an externally splined power take off (PTO) shaft of a prime mover and a driveline of an implement that is configured to be driven by the prime mover to operate the implement.

BACKGROUND

Conventionally, the process of coupling an externally splined power take off (PTO) shaft of a prime mover to an internally splined coupler which is operatively interconnecting the former with a driveline of an implement to be driven by power received from the prime mover involves rotating either one of the coupler or the PTO shaft so that the splines become angularly aligned with each other, as otherwise the PTO shaft cannot be inserted into the coupler due to interference of the misaligned splines. Aligning the splines of the coupler and the PTO shaft can be difficult.

SUMMARY OF THE INVENTION

According to an aspect of the invention there is provided a coupler for operatively interconnecting an externally splined power take off (PTO) shaft of a prime mover and a driveline of an implement that is configured to be driven by the prime mover so as to operate the implement, the PTO shaft having at least one spline and a groove extending generally circumferentially of the PTO shaft such that the groove has a pair of sidewalls which are axially opposite one another with respect to an axis of the PTO shaft, the coupler comprising:

a coupling hub extending longitudinally between first and second ends and which is operatively connectable at its second end to the driveline of the implement;

the coupling hub defining a bore arranged to receive the PTO shaft, the bore extending longitudinally of the coupling hub and opening at the first end of the coupling hub so as to receive the PTO shaft passed therethrough;

the bore having a smooth cylindrical peripheral surface such that the bore is free of splines;

the coupling hub being arranged to support a spline-forming member at a periphery of the bore, the spline-forming member defining, on a radially inward side thereof in relation to the coupling hub, a longitudinally extending groove which is arranged to receive a respective one of the at least one spline of the PTO shaft;

the spline-forming member being movable in a radial direction relative to the bore between a working position in which the radially inward side of the spline-forming member projects into the bore at a prescribed depth for mating engagement of the groove with the respective one of the at least one spline of the PTO shaft and a retracted position in which the radially inward side of the spline-forming member is located further radially outwardly than in the working position such that the groove is free of mating engagement with the respective spline of the PTO shaft;

a locking member arranged for mating engagement with the groove of the PTO shaft and supported for movement relative to the bore between a locking position in which the locking member projects into the bore at a prescribed depth for mating insertion into the groove of the PTO shaft and an unlocked position in which the locking member is located further radially outwardly than in the locking position so as to be free of mating engagement with the groove of the PTO shaft; and a control component supported for operative association with the spline-forming member and the locking member and arranged to enable displacement of the spline-forming member between the retracted and working position and to enable displacement of the locking member between the unlocked and locked positions.

This arrangement provides an internally splined coupler device which can selectively retract its splines, and in some instances provide a smooth interior surface, during insertion of the PTO shaft into the coupler device, so as to reduce alignment of the splines typically required of conventional coupler devices before the PTO shaft is inserted. The need to rotationally align the splines of the two parts is further minimized when a plurality of the spline-forming members are used such that minimal or no relative rotation is required to enable mating coupling of the splines.

Preferably, there is provided a plurality of the spline-forming members at circumferentially spaced positions of the bore such that each spline-forming member receives, in the working position thereof, a different one of a plurality of the splines of the PTO shaft.

Preferably, the groove of each spline-forming member is formed by a pair of longitudinally extending protrusions of the spline-forming member and the plurality of the spline-forming members are arranged circumferentially of the bore so that in the working positions thereof each circumferentially adjacent pair of the spline-forming members defines a groove between outer peripheries thereof that is arranged to receive a respective one of the splines of the PTO shaft.

Preferably, the coupling hub defines at least one opening in the peripheral surface of the bore such that the at least one opening is in communication with the bore at a radial location relative thereto, the at least one opening being arranged to respectively seatingly receive the spline-forming member, and the at least one opening being shaped to substantially match an outer periphery of the spline-forming member disposed in the working position so that the at least one opening acts to provide support to the spline-forming member when disposed in the working position.

Preferably, the locking member is disposed at a common circumferential location as the spline-forming member such that the locking member is seated in an opening defined therein at the radially inward side of the spline-forming member.

Preferably, the opening in the spline-forming member is shaped to substantially match an outer periphery of the locking member disposed in the locking position so that the opening acts to provide support to the locking member when disposed in the working position.

Preferably, the locking member is movable between the unlocked and locking positions independently of movement of the spline-forming member between the retracted and working positions.

Preferably, the control component is carried on the coupling hub for pivotal movement relative thereto between an unlocked position in which the spline-forming member is positionable in the retracted position thereof and a locked position in which the spline-forming member is disposed in the working position, and the control component defines, on a radially inward side thereof relative to the coupling hub, a cam surface arranged to slidingly engage a cam surface on a radially outward side of the spline-forming member to enable displacement of the spline-forming member between the retracted and working positions, the cam surface of the control component comprising a first portion corresponding to the unlocked position and a second portion corresponding to the locked position which is circumferentially adjacent the first portion and located further radially inwardly than the first portion in a direction generally towards the bore.

Preferably, the cam surface of the spline-forming member extends across only a partial arcuate width of the spline-forming member at the radially outward side thereof.

Preferably, the cam surface of the spline-forming member extends from a leading circumferential side of the spline-forming member, relative to a direction of pivotal movement of the control component from the unlocked position to the locked position, to a spaced location from an opposite trailing side of the spline-forming member.

Preferably, the first portion of the cam surface of the control component, which corresponds to the unlocked position thereof, is substantially equal in arcuate width to the cam surface of the spline-forming member.

Preferably, the second portion of the cam surface of the control component, which corresponds to the locked position thereof, is shorter in arcuate width than the cam surface of the spline-forming member.

Preferably, the spline-forming member is floatingly seated in each of at least one opening defined by the coupling hub in the peripheral surface of the bore so as to be in communication with the bore, such that, in the unlocked position of the control component, the spline-forming member is free to move between the retracted and working positions.

Preferably, when the locking member is disposed at a common circumferential location as the spline-forming member such that the locking member is seated in an opening defined therein at the radially inward side of the spline-forming member, and when the locking member is movable between the unlocked and locking positions independently of movement of the spline-forming member between the retracted and working positions, the locking member defines a cam surface on a radially outward side thereof arranged for sliding engagement with the cam surface of the control component so as to be displaceable thereby between the unlocked and locking positions when the control component is moved between the unlocked and locked positions thereof.

Preferably, the locking member is located at a circumferentially spaced location from a leading end of the cam surface of the spline-forming member, relative to a direction of pivotal movement of the control component from the unlocked position to the locked position, such that the locking member is displaced by the control component into the locking position after the spline-forming member has been displaced to the working position by the control component.

Preferably, the spline-forming member and the locking member are sized substantially the same in a radial direction between the cam surfaces at the radially outward sides thereof and radially innermost tips at the radially inward sides thereof.

Preferably, the locking member is floatingly seated in the opening defined in the spline-forming member, such that, in the unlocked position of the control component, the locking member is free to move between the unlocked and locking positions.

Preferably, the control component is biased to the locked position.

Preferably, the control component is biased to the locked position by a biasing member connected at one of the opposite ends in fixed relation to the coupling hub and at another one of the opposite ends in fixed relation to the control component.

Preferably, the biasing member is arranged to resist compression between its opposite ends such that the biasing member is compressed when the control component is moved from the locked position to the unlocked position.

Preferably, the biasing member is received in a channel formed in a distinct member which is connected to the coupling hub in fixed rotational relation with respect to a longitudinal axis thereof and generally at the second end thereof.

Preferably, the control component is in the form of a collar rotatably carried over the coupling hub and arranged for gripping by a user.

In one arrangement, in the retracted position of the spline-forming member, the spline-forming member is recessed from the bore so as to be located externally thereof.

In one arrangement, in the retracted position of the locking member, the locking member is recessed from the bore so as to be located externally thereof.

Preferably, an outer periphery of the spline-forming member is tapered in width between sides of the spline-forming member which are circumferentially opposite one another relative to the bore such that the width of the spline-forming member decreases from a radially outward side of the spline-forming member to the radially-inward side thereof.

Preferably, the spline-forming member is elongated in the longitudinal direction of the coupling hub.

In one arrangement, the control component is arranged to be retained in the unlocked position against biasing to the locked position.

In one such arrangement, the coupler further includes a retention device supported on the coupling hub and biased outwardly, relative to a longitudinal axis of the coupling hub, for selectively protruding through an opening in the control component alignable with the retention device in the unlocked position of the control component.

In one arrangement, the retention device comprises a protruding portion arranged for passing into the opening in the control component in a blocking state of the retention device and a base portion of the retention device arranged for engaging the radially inward side of the control component when the protruding portion is in said opening.

In one arrangement, the protruding portion defines a blocking surface adjacent to and upstanding from the base portion for engaging an interior surface of the opening in the control component, wherein the blocking surface is on a leading side of the retention device relative to a direction of pivotal movement from the unlocked position to the locked position, and wherein the protruding portion defines a ramped surface inclined outwardly and in said direction of pivotal movement of the control component so that the pivotal movement of the control component in said direction is enabled to depress the retention device.

BRIEF DESCRIPTION OF THE DRAWINGS

The invention will now be described in conjunction with the accompanying drawings in which:

FIG. 8 is an exploded view of another arrangement of coupler with a retention device for retaining a control component in an unlocked position thereof;

FIG. 9 is an end view of the coupler of FIG. 8 showing, in phantom, the spline-forming members and the locking members in respective retracted and unlocked positions, a control component of the coupler in an unlocked position thereof, and the retention device in a blocking state thereof;

FIG. 10 is an end view of the coupler of FIG. 8 similar to FIG. 9 but showing the spline-forming members and the locking members in respective working and locking position, the control component in a locked position thereof, and the retention device in an unblocking state.

In the drawings like characters of reference indicate corresponding parts in the different figures.

DETAILED DESCRIPTION

Figure 1:
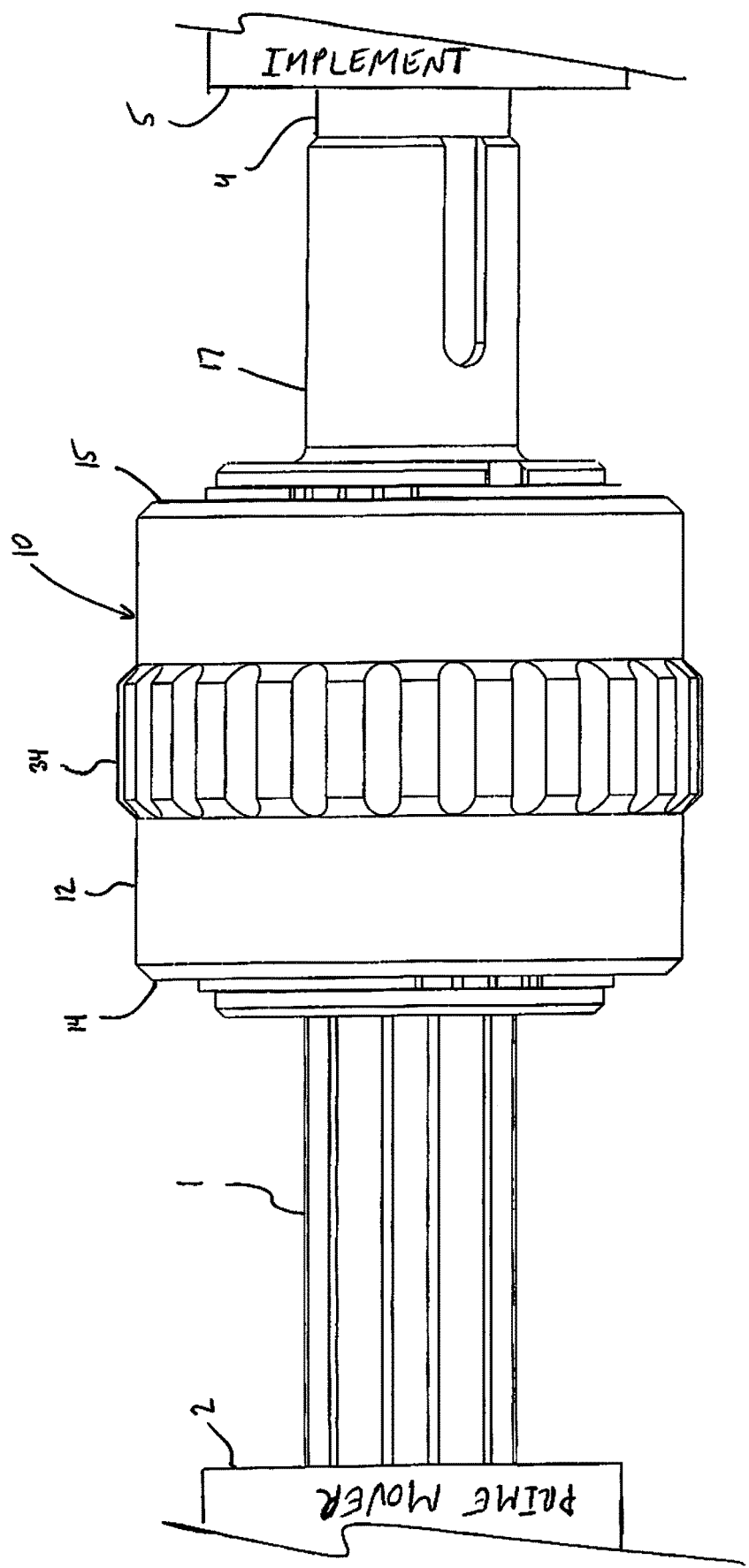
FIG. 1 is a side view of a coupler according to an arrangement of the present invention, operatively interconnecting an externally splined PTO shaft of a prime mover and a driveline of an implement.
Figure 2:
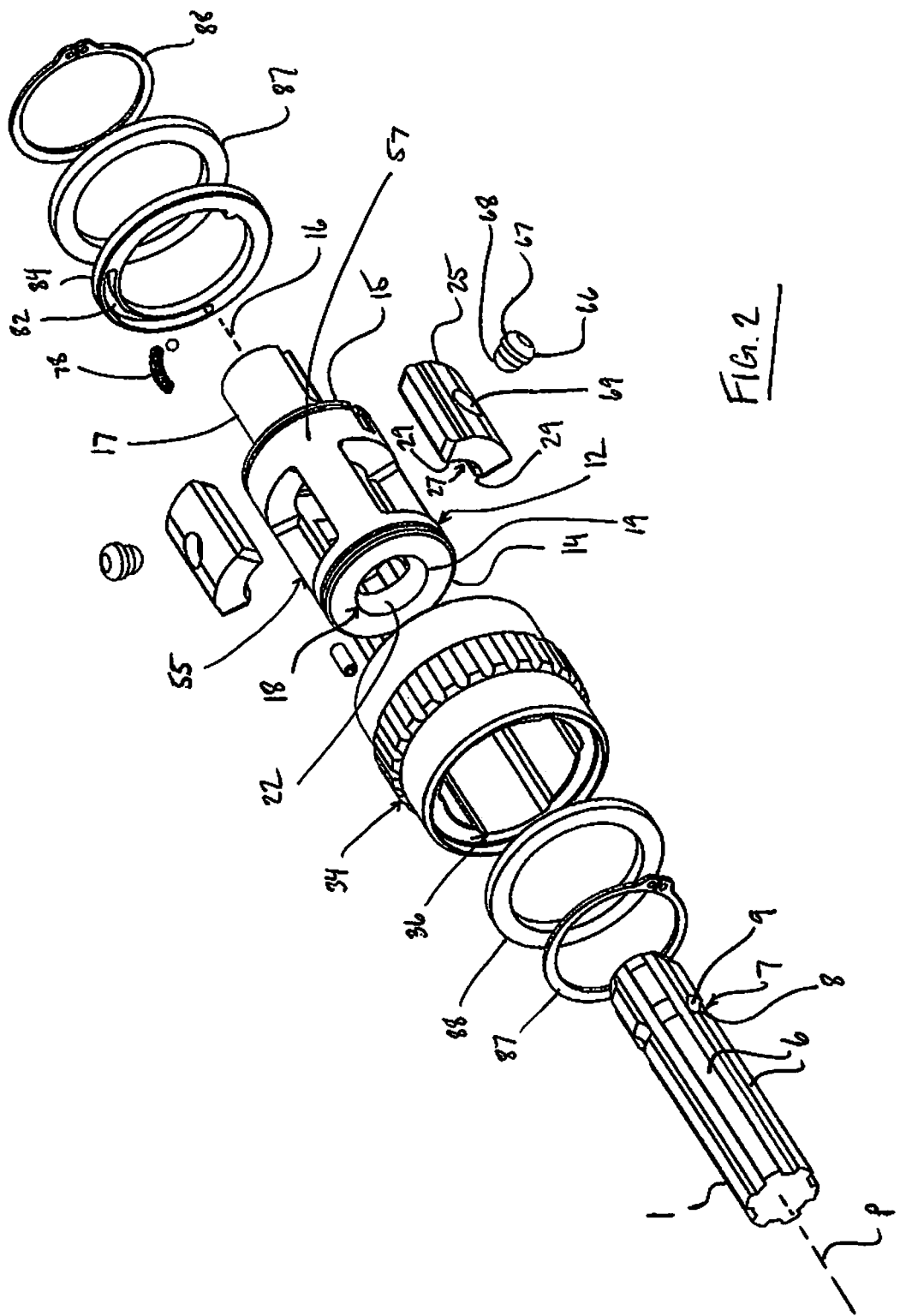
FIG. 2 is an exploded view of the coupler of FIG. 1 with the PTO shaft.

The accompanying figures show a coupler, which is indicated at 10, for operatively interconnecting an externally splined power take off (PTO) shaft 1 of a prime mover 2 (schematically shown), such as a tractor, and a driveline 4 of an implement 5 (also schematically shown), such as a tow-behind mower, that is configured to be driven by the prime mover 2 so as to operate the implement 5. The PTO shaft 1 has at least one spline 6 and a groove 7 extending generally circumferentially of the PTO shaft such that the groove has a pair of sidewalls 8, 9 which are axially opposite one another with respect to an axis P of the PTO shaft. Typically the PTO shaft 1 has a plurality of splines 6 and the groove 7 is defined in at least one of the splines.

The coupler 10 generally comprises a coupling hub 12 extending longitudinally between first and second ends 14, 15 and operatively connectable at its second end 15 to the driveline 4 of the implement 5. In the illustrated arrangement, the coupling hub 12 is a substantially cylindrically shaped unitary metal body, extending along a longitudinal axis 16 thereof, with a stub shaft 17, which is arranged for connecting to the implement's driveline, located at and extending longitudinally from the second end 15 of the hub 12.

The coupling hub 12 defines a bore 18, that is, an interior cavity, which is arranged to receive the PTO shaft 1. The bore 18 extends longitudinally of the coupling hub 12 and opens at the first end 14 thereof as indicated at 19 so as to accept the PTO shaft therethrough, or in other words to receive the PTO shaft passed therethrough. In the illustrated arrangement, the bore 18 also opens at the second end 15 of the hub 12, as indicated at 20 and more clearly shown in FIG. 3.

The bore 18 is arranged to receive the PTO shaft in that it is sized and generally cylindrically shaped in order to receive the PTO shaft 1. In the illustrated arrangement, an overall diameter of the bore 18 is sized slightly larger than an overall diameter of the splined PTO shaft 1 such that the former provides a semi-snug fit for the latter.

In contrast to conventional couplers used to operatively connect a prime mover's PTO shaft and an implement's driveline, which are machined to have an internally splined bore, the bore 18 of the coupler 10 has a smooth cylindrical peripheral surface 22 such that the bore is free of splines.

Thus, in the case of the present invention, splines are provided by at least one spline-forming member 25 which is distinct from the bore 18 and supported by the coupling hub 12 at a periphery thereof defined by the peripheral surface 22. Accordingly, the coupling hub 12 is arranged to support the spline-forming member 25 in the afore-described relation to the bore 18. The spline-forming member 25 defines, on a radially inward side thereof in relation to the coupling hub 12, a longitudinally extending groove 27 which is arranged to receive a respective one of the splines 6 of the PTO shaft 1.

The groove 27 of each spline-forming member 25 is formed by a pair of longitudinally extending protrusions 29 of the spline-forming member such that the spline-forming member is generally wholly horseshoe shaped, or in other words generally U-shaped (though not intended to be limiting of orientation of the member). Also, each spline-forming member 25 is, as a whole, elongated in the longitudinal direction of the coupling hub 12, so as to provide a larger surface area of mating contact with the respective spline of the shaft. The protrusions 29 are arranged to fit in grooves formed on either side of the matingly received spline 6 between the same and a circumferentially adjacent one of the splines on the PTO shaft 1.

In the illustrated arrangement there are provided a plurality of the spline-forming members 25 at circumferentially spaced positions of the bore 18 such that each spline-forming member receives a different one of the axially extending splines 6 of the PTO shaft 1. Furthermore, the plurality of the spline-forming members 25 are arranged circumferentially of the bore 18 so that each circumferentially adjacent pair of the spline-forming members 25 can form a groove 31 between outer peripheries thereof arranged to receive a respective one of the splines of the PTO shaft, as more clearly shown in FIG. 6. In the illustrated arrangement, this means that the total number of spline-forming members 25 provided in the coupler 10 is half of the number of splines 6 on the PTO shaft 1, and the spline-forming members 25, when mated with the splines 6, are spaced from one another in the circumferential direction of the bore 18 by an arc or arcuate distance substantially equal to a width of one spline.

In order to ease insertion of the splined PTO shaft 1 into the coupler 10 for subsequent operative connection to the driveline 4, with minimal rotational pre-alignment prior to passing the PTO shaft through the bore opening 19 at the first end 14 of the hub 12, the spline-forming members 25 are retractable from working positions thereof in which the protrusions 29 on the radially inward sides of the spline-forming members project into the bore 18 at a prescribed depth for mating engagement of the grooves 27 with the respective splines 6 of the PTO shaft so that rotation of the PTO shaft 1 is effectively transmitted to the driveline 4 substantially without relative rotational movement between the PTO shaft and the coupler 10 about their coaxial axes. That is, the spline-forming members 25 are movable in respective radial directions relative to the bore 18 between the afore-described working positions of the members, as shown for example in FIG. 3, and retracted positions thereof in which the protrusions 29 on the radially inward sides of the spline forming members are located further radially outwardly than in the working positions such that the grooves 27 are free of mating engagement with the respective splines 6 of the PTO shaft 1, as shown for example in FIG. 4. Generally speaking, at the prescribed depth in the working positions of the spline-forming members 25, the splines 6 are substantially fully seated or received in the corresponding grooves 27 of the spline-forming members 25. It therefore will be appreciated that in the retracted positions of the spline-forming members, the spline-forming members 25 may still protrude slightly into the bore 18 so as to make contact with outermost end portions of the splines 6 of the PTO shaft that is sufficient to help guide the PTO shaft 1 into the bore 18 in substantial but not precise rotational alignment with the grooves 27. In other arrangements, as shown for example in FIG. 5, the spline-forming members 25 disposed in the retracted positions are recessed from the bore 18 so as to be located externally thereof.

The radial movement of the spline-forming members 25 is provided at least in part by a control component 34 supported for operative association with the spline-forming members 25 and arranged to enable displacement of the spline-forming members between the retracted and working positions. In the illustrated arrangement, the control component 34 is in the form of a collar arranged for gripping by a user that is rotatably carried on an outside of the coupling hub 12, which defines, on a radially inward side thereof relative to the coupling hub 12, an interior cam surface 36 arranged to slidingly engage outer cam surfaces 38 on radially outward sides of the spline-forming members 25, such that the control component 34 is generally pivotally movable about a pivot axis defined by the hub's longitudinal axis 16 between an unlocked position in which the spline-forming members 25 are positionable in their retracted positions and a locked position of the control component 34 in which the spline-forming members 25 are disposed in their working positions.

Figure 6:
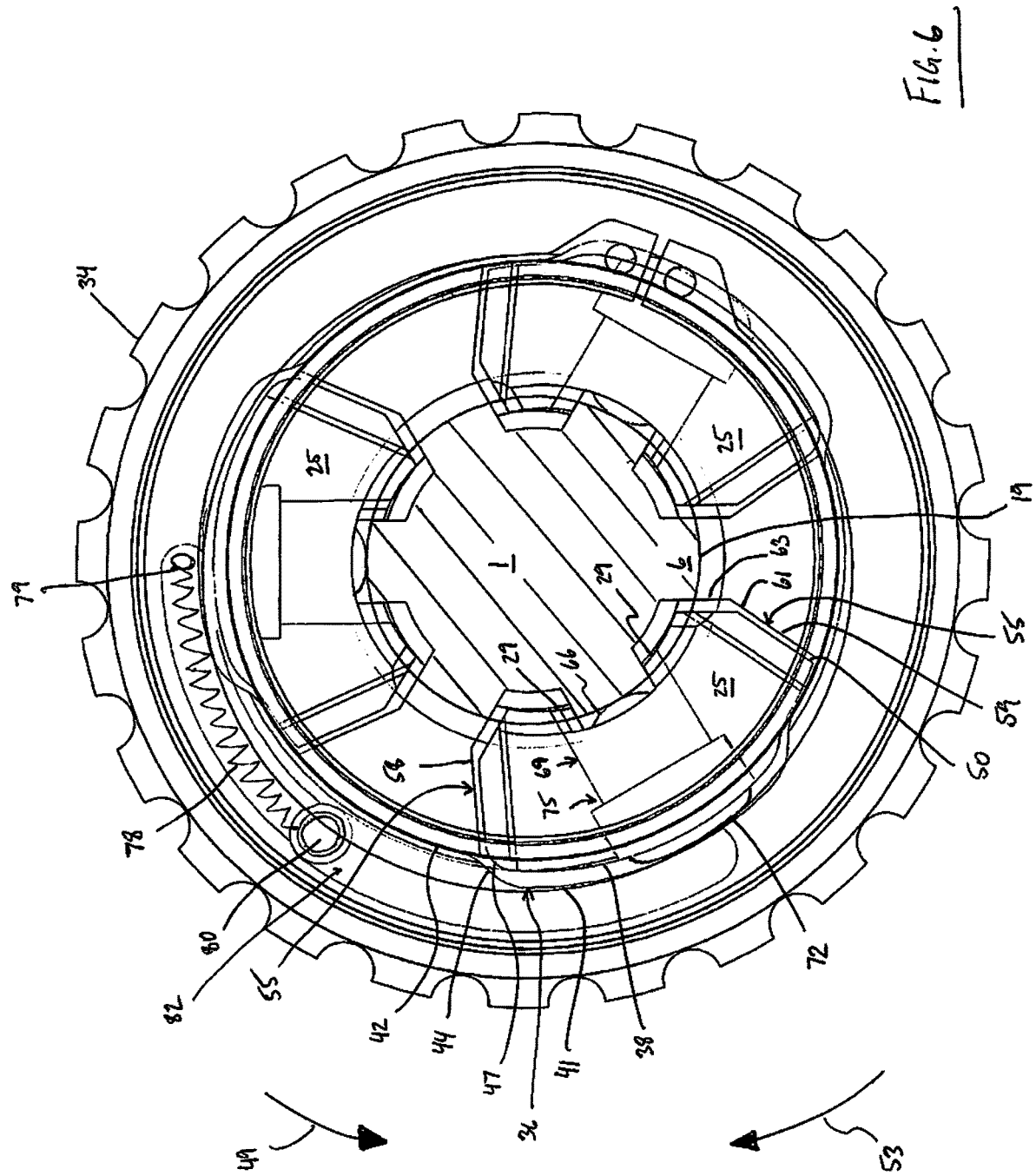
FIG. 6 is an end view of the coupler of FIG. 1 similar to FIG. 4 but showing, in phantom, the spline-forming members and the locking members in respective retracted and unlocked positions with a control component of the coupler in an unlocked position thereof, and the PTO shaft in cross-section.

Referring to FIG. 6, the cam surface 36 of the control component 34 comprises a first cam portion 41 corresponding to the unlocked position and a second cam portion 42 corresponding to the locked position, which is circumferentially adjacent the first cam portion 41 and located further radially inwardly than the first portion in a direction generally towards the bore 18. Each of the cam portions 41, 42 corresponding to one of the various positions of the spline-forming members 25 traverses a circular arc relative to the central longitudinal axis 16 of the hub 12 so as to be at a uniform radial distance from the axis 16 across its full arcuate width. The interior cam surface 36 also includes a ramped transition 44 interconnecting the first and second cam portions 41, 42. As there multiple spline-forming members 25 uniformly spaced around the circumference of the bore 18, the cam surface 36 spans the whole inner surface of the collar 34 and the two camming portions 41, 42 are provided in an alternating arrangement around the inner circumference of the collar 34. Furthermore, in the illustrated arrangement, the control collar 34 is supported in rotation relative to the coupling hub 12 by the alternating second cam portions 42 around the full inner circumference of the collar 34.

Each spline-forming member also has a cam surface 38 cooperative with the cam surface 36 of the control collar 34. The cam surface 38 of the spline-forming member 25 also traverses a circular arc relative to the longitudinal axis 16 of the hub 12 so as to be at a uniform radial distance from the axis 16 across its full arcuate width, but extends across only a partial arcuate width of the spline-forming member 25 at the radially outward side thereof. As more clearly shown in FIG. 6, the spline-forming member's cam surface 38 extends from a leading circumferential side 47 of the spline-forming member 25, relative to a direction of pivotal movement of the control component from the unlocked position to the locked position as indicated by arrow 49, to a spaced location from an opposite trailing side 50 of the spline-forming member. In other words, the cam surface 38 substantially begins at the leading circumferential side 47 of the member 25 and terminates at an intermediate location on the spline-forming member. This enables a shorter range of pivotal movement of the control collar 34 from the locked position to the unlocked position, and also means that in the retracted position of the spline-forming member it becomes seated in the first cam portion 41 in angularly offset relation thereto.

The first cam portion 41 of the control collar 34, which corresponds to the unlocked position thereof, is substantially equal in arcuate width to the cam surface 38 of the spline-forming member. Also, the second cam portion 42 of the control collar 34, which corresponds to the locked position thereof, is shorter in arcuate width than the cam surface 38 of the spline-forming member and also, accordingly, the first cam portion 41.

Figure 7:
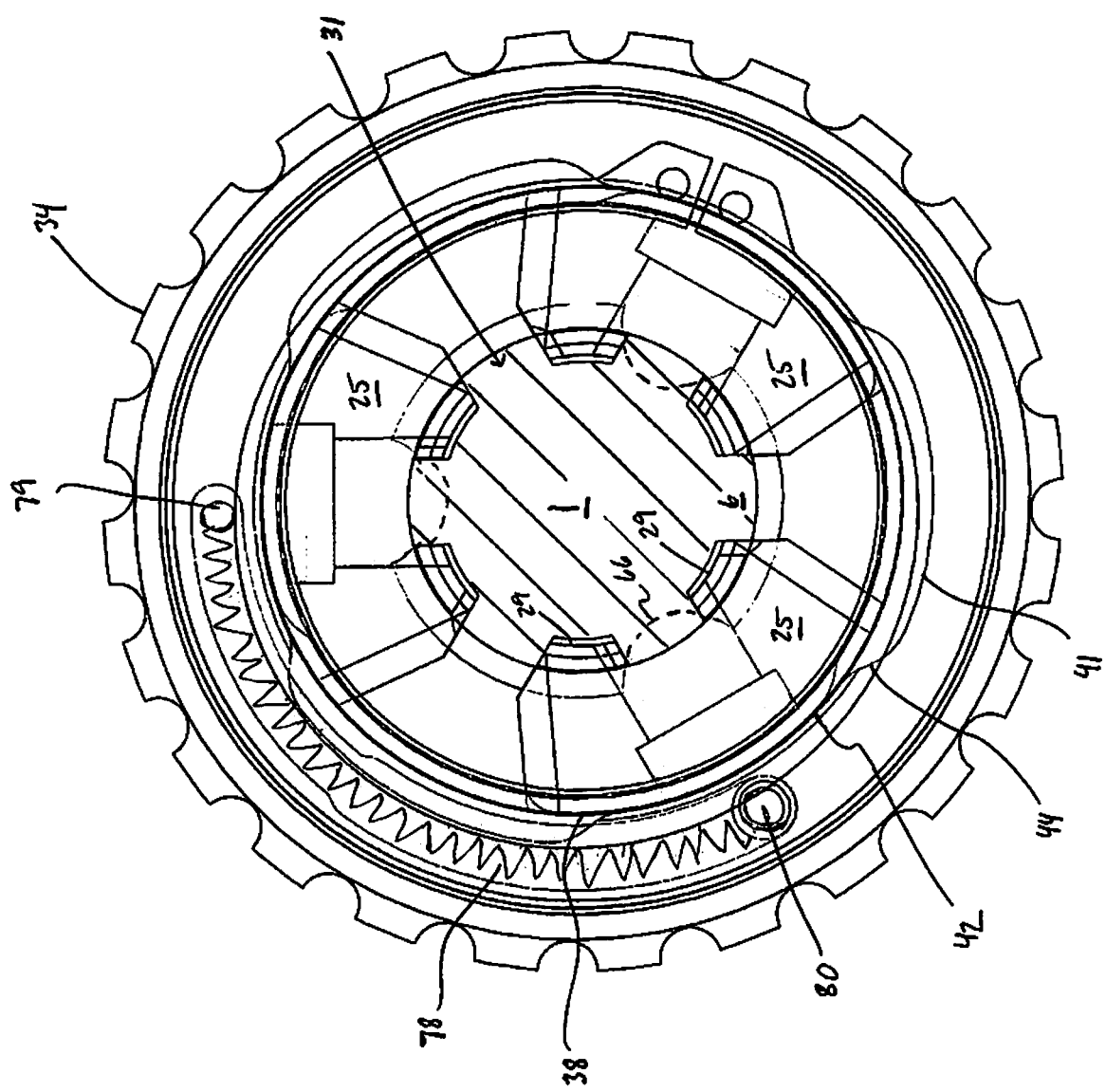
FIG. 7 is an end view of the coupler of FIG. 1 similar to FIG. 6 but showing the spline-forming members and the locking members in respective working and locking positions with the control component in a locked position thereof.

Thus, when the control collar 34 is moved from the unlocked position as more clearly shown in FIG. 6 to the locked position more clearly shown in FIG. 7, each spline-forming member 25 is cammed from the retracted positon when it is substantially seated in the first cam portion 41 to the working position when it is cammingly engaged by the second cam portion 42 trailing the first cam portion relative to the direction 49 of pivotal movement of the collar 34 from a starting unlocked position to an ending locked position. In the locked position, the second cam portion 42 is located substantially centrally of the cammingly engaged spline-forming member 25.

In a reverse direction 53, that is when the control collar 34 is moved from the locked position (FIG. 7) to the unlocked position (FIG. 6), each spline-forming member 25 is substantially cammed from the working position when it is cammingly urged by the second cam portion 42 into the working position to the retracted position when it can radially retract into the first cam portion 41 that trails the second cam portion relative to the direction 53 of pivotal movement of the collar 34 from a starting locked position to an ending unlocked position.

The control collar 34 and the spline-forming members 25 are disposed in camming engagement with each other as the spline-forming members 25 are seated in a plurality of radial openings 55 defined in the coupling hub 12 and arranged to receive one of the spline-forming members 25. The radial openings 55 are defined in the peripheral surface 22 of the bore, such that the radial openings 55 are in communication with the bore, and also opening also at an outer peripheral surface 57 of the hub 12.

The radial openings 55 are shaped to substantially match outer peripheries of the spline-forming members 25 seated therein, specifically in the longitudinal direction of the coupling hub 12 and in the circumferential direction of the bore 18, so as to suitably guide the spline-forming members 25 between the retracted and working positions and so as to provide support to the spline-forming members when disposed in the working position.

It will be appreciated that outer peripheries of the spline-forming members 25 are tapered in width between the sides of the spline-forming member indicated at 47 and 50, which are circumferentially opposite one another relative to the bore 18, such that the width of the spline-forming member decreases from the radially outward side of the spline-forming member to the radially-inward side thereof.

Accordingly, the radial openings 55 are also tapered in width between their circumferentially opposite sides 58, 59 from their radially outward-most end to their radially inward-most end at the peripheral surface 22 of the bore 18, but specifically this tapered shaped substantially matches the outer peripheries of the spline-forming members 25 when they are disposed in the working positions. As such, the sides 58, 59 of any one of the radial openings have first main portions 61 corresponding to the sides 47, 50 of the respective spline-forming member 25 and second end portions 63 which are adjacent to and terminate at the bore 18 that are inclined relative to the main portions 61 as if to converge at an earlier radial point than the first main portions 61 would. This means that the spline-forming members 25 can be arranged to be floatingly seated in the radial openings 55, as they are in the illustrated arrangement in which there is no biasing of the spline-forming members to either one of the retracted position or the working position, such that, in the unlocked position of the control collar 34, the spline-forming members 25 are free to move between the retracted and working positions.

Figure 3:
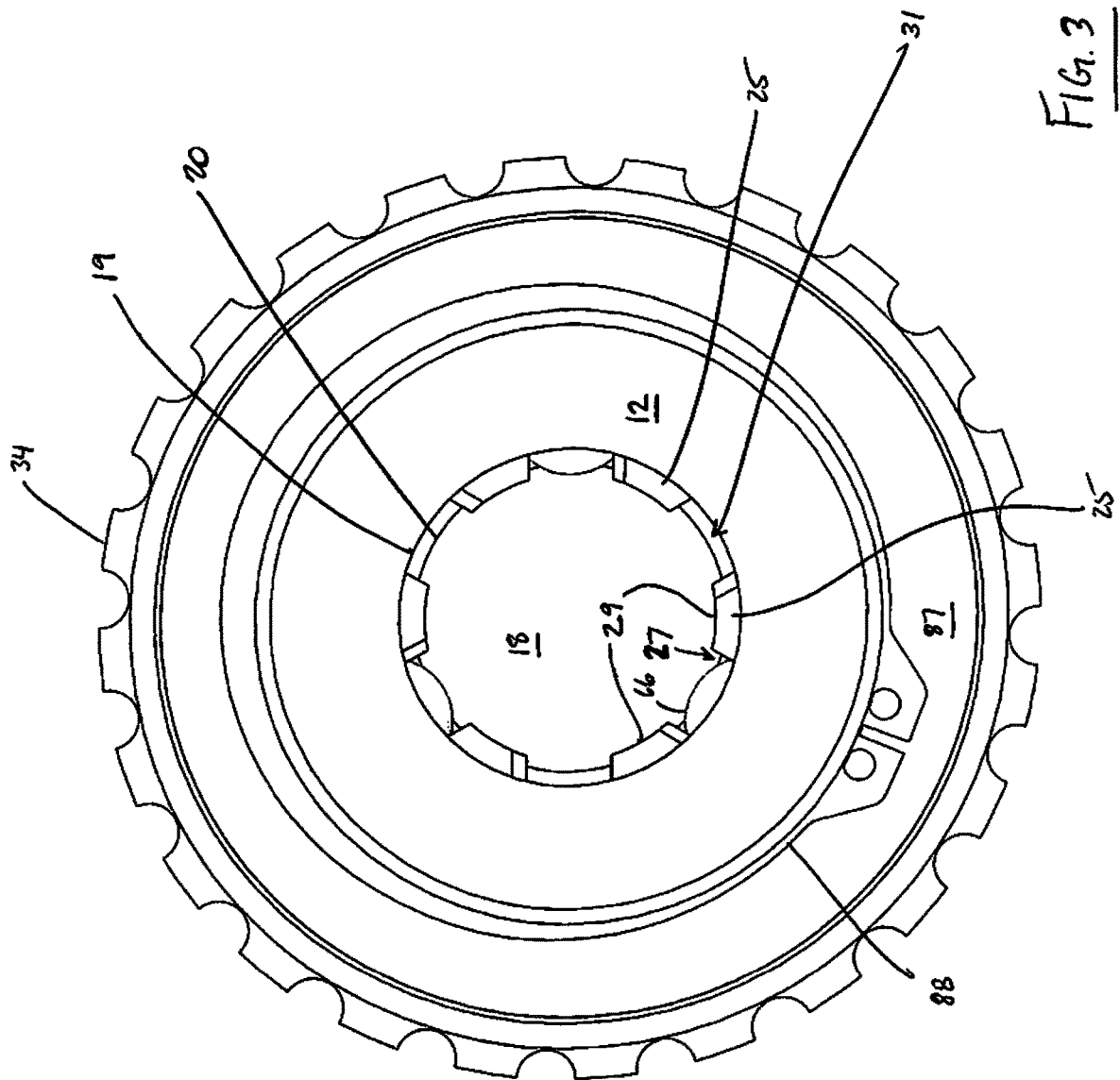
FIG. 3 is an end view of the coupler of FIG. 1 showing spline-forming members and locking members in respective working and locking positions.
Figure 4:
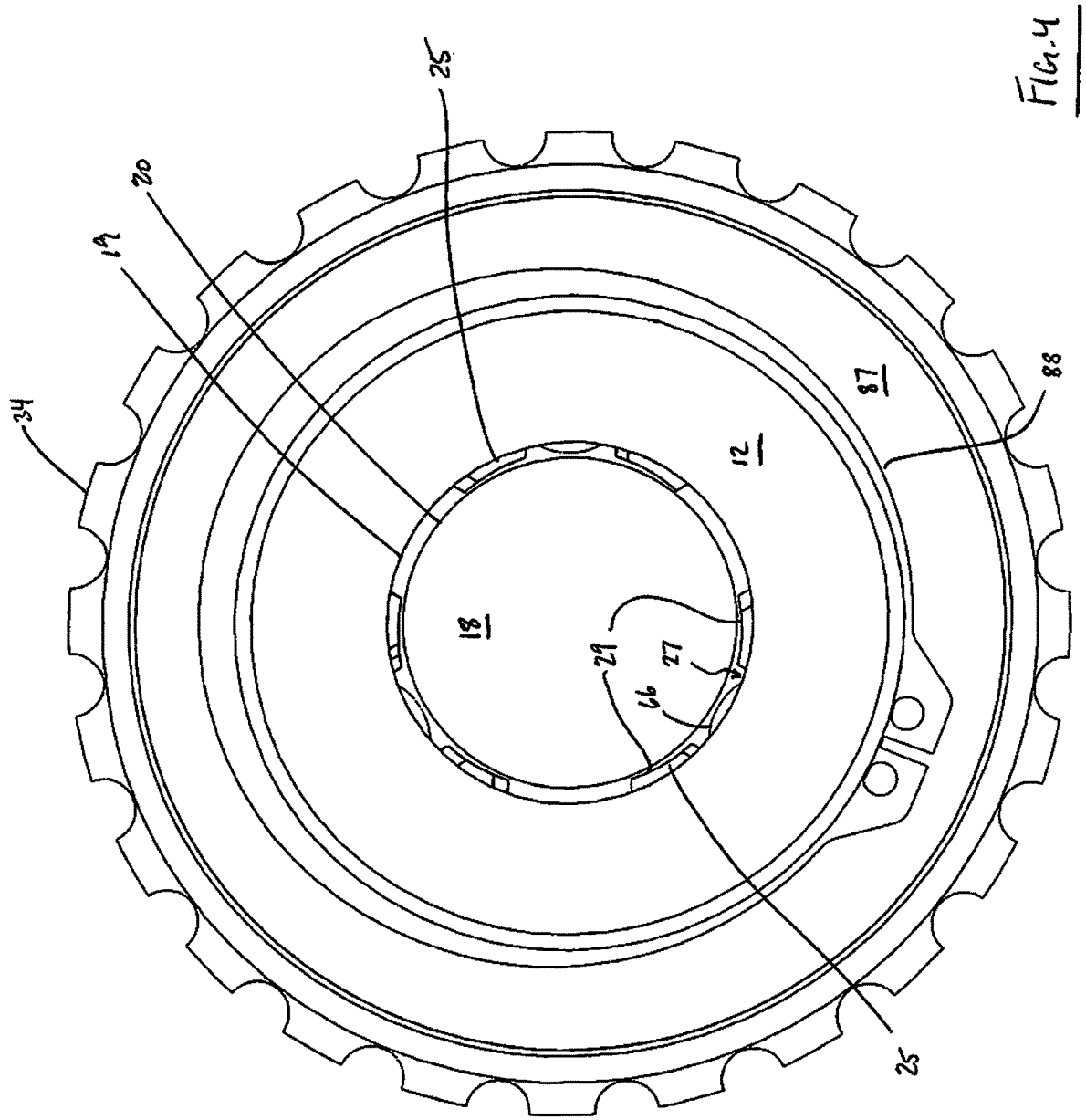
FIG. 4 is an end view of the coupler of FIG. 1 similar to FIG. 3 but showing the spline-forming members and the locking members in respective retracted and unlocked positions.
Figure 5:
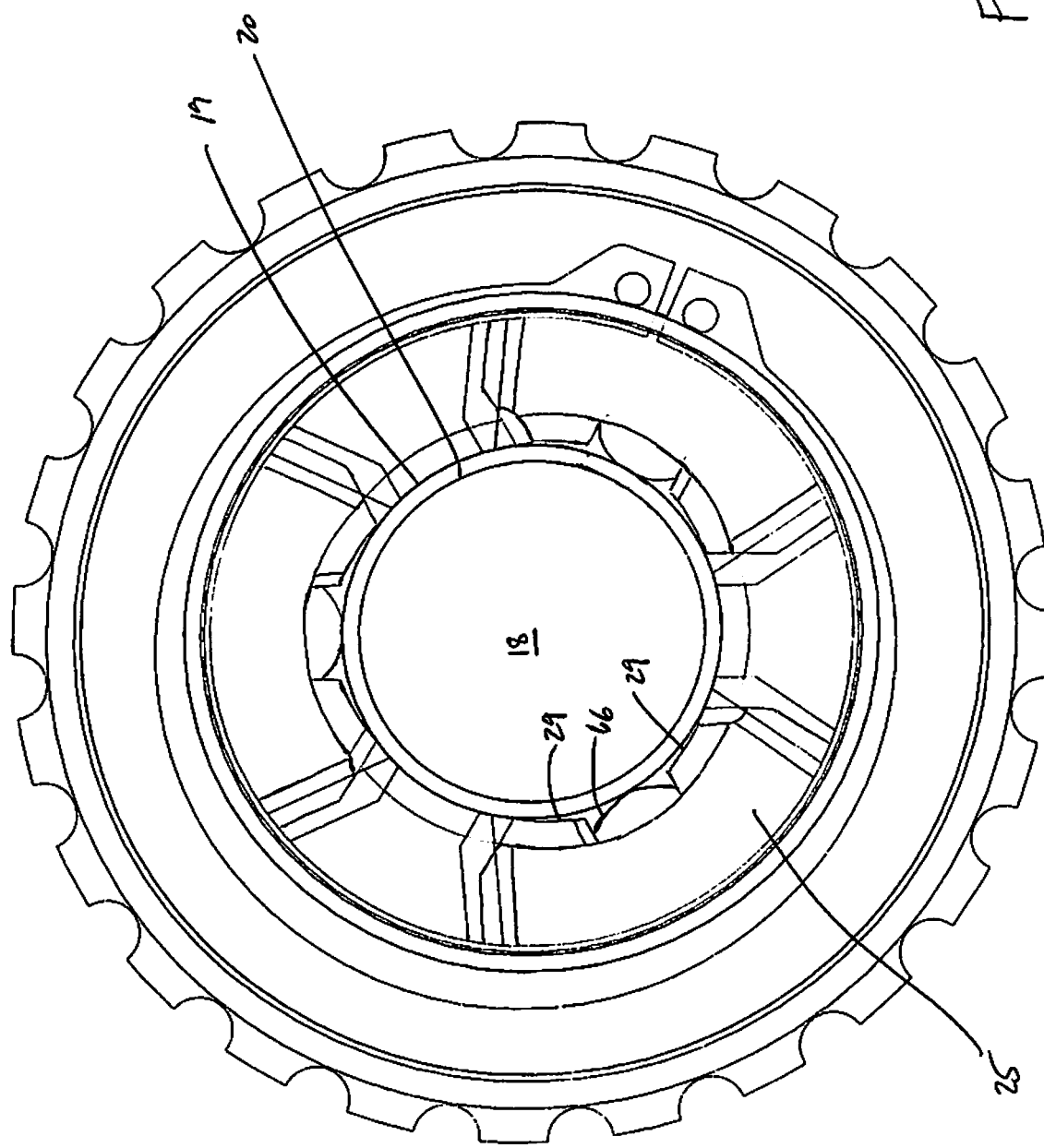
FIG. 5 is an end view of the coupler of FIG. 1 similar to FIG. 4 but showing the spline-forming members and the locking members in phantom as retracted from the bore.

Additionally to the spline-forming members 25 which mate with the external splines 6 of the PTO shaft so that the coupler 10 is held in fixed rotational relation to the PTO shaft about the axis P of the PTO shaft, the coupler 10 also includes at least one locking member 66 arranged for mating engagement with the groove 7 of the PTO shaft 1 so as to hold the coupler 10 in fixed longitudinal relation to the PTO shaft 1. In the illustrated arrangement, the coupler 10 includes a plurality of the locking members 66 which are supported for movement relative to the bore 18 between a locking position, as shown in FIG. 3 or 7, in which the locking member 66 projects into the bore 18 at a prescribed depth for mating insertion into the groove of the PTO shaft and an unlocked position, as shown in FIG. 4 or 6, in which the locking member 66 is located further radially outwardly than in the locking position so as to be free of mating engagement with the groove of the PTO shaft. In some arrangements, as shown in FIG. 4, in the retracted position of the locking member it is recessed from the bore 18 so as to be located externally thereof.

In the illustrated arrangement, each locking member 66 is longitudinally elongated in the radial direction of the bore 18 and comprises a radially enlarged base 67, relative to a longitudinal direction of the member 66, that is disposed at a radially outward side thereof and generally cylindrical main body 68 defining a convex substantially-hemispherical tip at a radially inward side of the member 66.

Since the spline-forming members 25 of the coupler 10 undergo similar radial movement between matingly-engaging and non-matingly-engaging positions with respect to the PTO shaft 1, the locking members 66 are disposed at common circumferential locations as the spline-forming members 25 so as to be controllable in movement between the locking and retracted positions by a common control component 34. In other words, the locking members 66 are arranged to be circumferentially coincident with the spline-forming members 25 with respect to location around the bore 18. In the illustrated arrangement, this is accomplished by seating the locking members 66 in openings 69 defined in the spline-forming members 25 at the radially inward side thereof such that the locking members are independently movable of the spline-forming members in the radial direction. Since the groove 7 in the PTO shaft coincides with the splines 6 and is substantially continuous around the full circumference of the PTO shaft so as to be defined in all of the splines 6, the locking members 66 are aligned radially of the bore 18 with the grooves 27 defined by the spline-forming members 25, and both are located centrally of a common corresponding spline-forming member.

As the control component 34 uses a cam surface 36 to control radial movement, the locking member-receiving openings 69 are also open at the radially outward sides of the spline-forming members 25 so that cam surfaces 72 on radially outward sides thereof, which are arranged for sliding engagement with the cam surface 36 of the control component 34, can be provided to enable displaceability of the locking members 66 between the unlocked and locking positions when the control component 34 is moved between the unlocked and locked positions thereof. These openings 69 are shaped to substantially match outer peripheries of the locking members 66 when they are disposed in the locking position so as to provide support to the locking members 66 in the locking position. Thus each opening 69 forms a circumferential shoulder 75 to engage the enlarged base 67 in the locking position, and is generally cylindrical on either side of the shoulder 75 but with different cross-sectional sizes. Additionally, the spline-forming members 25 and the locking members 66 are sized substantially the same in the radial direction of the bore 18 between the cam surfaces at the radially outward sides thereof and radially innermost tips at the radially inward sides thereof as the depth of the circumferential groove 7 in the PTO shaft is similar to heights of the external splines 6, allowing a common cam surface 36 to operate both the spline-forming members 25 and the locking members 66.

For each pair of circumferentially coincident spline-forming member 25 and locking member 66, the locking member 66 is located at a circumferentially spaced location from a leading end 47 of the cam surface 38 of the spline-forming member 25, relative to the direction of pivotal movement of the control collar 34 from the unlocked position to the locked position indicated by arrow 49, such that the locking member 66 which is independently movable of the spline-forming member is displaced by the control collar 34 into the locking position after the spline-forming member 25 has been displaced to the working position by the control collar 34. In the reverse direction 53, when the control collar 34 is moved from the locked position to the unlocking position, the locking member 66 which has a shorter cam surface 72 than the cam surface 38 of the spline-forming member is released from the locking position before the spline-forming member 25 is released from its working position. Once the cam surface 72 of the locking member is registered with the first cam portion 41 of the control collar 34, the locking member 66 is free to move between the unlocked and locking positions as there is no biasing provided in the illustrated arrangement to urge the member 66 to either the unlocked position or the locking position. If the locking member 66 is maintained in the locked position even after the control collar 34 is positioned in the unlocking position, removal of the PTO shaft 1 out of the bore 18 will act to guide the locking member into the unlocked position by virtue of its convexly curved tip.

Since a cam arrangement is used to control the positions of the spline-forming members 25 and locking members 66 relative to the bore 18 without any biasing towards the interior cam surface 36 of the control collar 34, it is favourable to arrange the control component 34 so that it is biased to the locked position in which the foregoing components are maintained in predefined positions. As more clearly shown in FIGS. 6 and 7, this biasing is achieved by a biasing member 78 in the form of a tension spring, which is arranged to resist compression between its opposite ends, one of which is connected in fixed relation to the coupling hub 12 at 79 and the other which is connected in fixed relation to the control collar 34 at 80. The biasing member 78 is received in a channel 82 formed in a distinct member 84 which is connected to the coupling hub 12 in fixed rotational relation with respect to the longitudinal axis 16 thereof and generally at the second end 15 thereof. The distinct member 84 is annular so that the stub shaft 17 can be passed therethrough. Thus when the control collar 34 is rotated from the locked position to the unlocked position the biasing member 78 is compressed within the channel 82 between its ends 79, 80 and urges the collar 34 back to the locked position when external counteractive forces exerted by the user are removed.

Additional components 87, 88 are provided to maintain the coupler 10 as a unitary assembly.

FIGS. 8-10 show another arrangement of coupler 10' in which control component 34' is arranged to be retained in the unlocked position despite biasing thereof to the locked position.

This functionality is achieved by a retention device 90 which is supported in fixed location on the coupling hub 12' and biased outwardly from the axis 16 in order to selectively protrude through an alignable opening 92 in the control component 34' to resist pivotal movement thereof. That is, the retention device 90 is movable, relative to the coupling hub, in a generally radial direction, between a blocking state (FIG. 9) in which the control component 34' is retained in the unlocked position and an unblocked state (FIG. 10) in which the control component is free to move from the unlocked position to the blocked position. However, an axis of the device's movement between blocking and unblocked states is fixed relative to the coupling hub. As such, the retention device 90 is located in fixed rotational relation and in fixed longitudinal relation to the coupling hub.

In the illustrated arrangement, the retention device 90 is in the form of a depressible button, which is carried on a biasing member 94 in the form of a tension spring arranged to resist compression between its opposite ends. One of the ends of the spring 94 is arranged to engage the retention button 90 so as to urge it outwardly, away from the coupling hub 12', and an opposite end of the spring 94 is arranged to engage the coupling hub. A recess 96 may be provided in an outer surface of the coupling hub 12' to provide sufficient range of movement for the retention button, as will be better appreciated shortly.

A hole 98 is provided in distinct member 84' in which biasing member 82 is received, so that the retention device can engage the control component 34'.

In order to selectively protrude through the retention opening 92 in the control component, the retention device 90 comprises a protruding portion 100 arranged for passing into the opening 92 in the blocking state, by being sized and shaped to be received in the opening 92, and a base portion 102 arranged for engaging a surface 104 on the radially inward side of the control component 34' when the protruding portion is in the alignable opening 92. As such, the base portion 102 acts as a stop for limiting passage of the retention device 90 into the retention opening 92. In the illustrated arrangement, the base portion 102 is enlarged relative to the protruding portion 100, around the fully periphery thereof, in a transverse direction to an axis 105 of movement of the retention device, which is substantially radial to the longitudinal axis 16. Thus the enlarged portion 102 forms an upper shoulder 109 extending outwardly from the protruding portion 100.

More specifically, the protruding portion 100 defines a blocking surface 112 adjacent to and upstanding from the shoulder 109 of the base portion 102 for engaging an interior surface 113 of the opening in the control component, in order to obstruct pivotal movement from the unlocked to the locked position of the collar. The blocking surface 112 is on a leading side 115 of the retention device relative to the direction of pivotal movement from the unlocked position to the locked position as indicated by arrow 53. Furthermore, the protruding portion 100 defines a ramped surface 118 which is inclined outwardly and in the direction 53 of pivotal movement of the control component so that the pivotal movement of the control component in this direction is enabled to depress the retention device. In other words, the control component 34' is enabled to cammingly depress the retention device from the blocking state to the unblocked state.

As shown in FIG. 9, in the illustrated arrangement the opening 92 is formed through a full thickness of the control collar 34' between radially inward and outward sides thereof, and the retention device 90, in the blocking state, protrudes outwardly past the radially outward side of the control collar 34' so as to present an upper surface 121 proud of the collar 34', which is exposed for contact by a user to manually partially depress the retention button toward the unblocked state, such that the collar 34' can be returned to the locked position. In the unblocked state, the upper surface 121 of the retention device 90 cammingly engages the radially inward side of the control component 34' due to the outward biasing of the device 90. Thus the retention device is urged to return to the blocking state, when the opening 92 is rotationally aligned with the retention device 90, which corresponds to the unlocked position of the control component 34'.

The scope of the claims should not be limited by the preferred embodiments set forth in the examples but should be given the broadest interpretation consistent with the specification as a whole.

The invention claimed is:

1. A coupler for operatively interconnecting an externally splined power take off (PTO) shaft of a prime mover and a driveline of an implement that is configured to be driven by the prime mover so as to operate the implement, the PTO shaft having at least one spline and a groove extending generally circumferentially of the PTO shaft such that the groove has a pair of sidewalls which are axially opposite one another with respect to an axis of the PTO shaft, the coupler comprising:

a coupling hub extending longitudinally between first and second ends and which is operatively connectable at its second end to the driveline of the implement;

the coupling hub defining a bore arranged to receive the PTO shaft, the bore extending longitudinally of the coupling hub and opening at the first end of the coupling hub so as to receive the PTO shaft passed therethrough;

the bore having a smooth cylindrical peripheral surface such that the bore is free of splines;

the coupling hub being arranged to support a spline-forming member at a periphery of the bore, the spline-forming member defining, on a radially inward side thereof in relation to the coupling hub, a longitudinally extending groove which is arranged to receive a respective one of the at least one spline of the PTO shaft;

the spline-forming member being movable in a radial direction relative to the bore between a working position in which the radially inward side of the spline-forming member projects into the bore at a prescribed depth for mating engagement of the groove with the respective one of the at least one spline of the PTO shaft and a retracted position in which the radially inward side of the spline-forming member is located further radially outwardly than in the working position such that the groove is free of mating engagement with the respective spline of the PTO shaft;

a locking member arranged for mating engagement with the groove of the PTO shaft and supported for movement relative to the bore between a locking position in which the locking member projects into the bore at a prescribed depth for mating insertion into the groove of the PTO shaft and an unlocked position in which the locking member is located further radially outwardly than in the locking position so as to be free of mating engagement with the groove of the PTO shaft; and a control component supported for operative association with the spline-forming member and the locking member and arranged to enable displacement of the spline-forming member between the retracted and working position and to enable displacement of the locking member between the unlocked and locked positions.

2. The coupler of claim 1 wherein there is provided a plurality of the spline-forming members at circumferentially spaced positions of the bore such that each spline-forming member receives, in the working position thereof, a different one of a plurality of the splines of the PTO shaft.

3. The coupler of claim 2 wherein the groove of each spline-forming member is formed by a pair of longitudinally extending protrusions of the spline-forming member and the plurality of the spline-forming members are arranged circumferentially of the bore so that in the working positions thereof each circumferentially adjacent pair of the spline-forming members defines a groove between outer peripheries thereof that is arranged to receive a respective one of the splines of the PTO shaft.

4. The coupler of claim 1 wherein the coupling hub defines at least one opening in the peripheral surface of the bore such that the at least one opening is in communication with the bore at a radial location relative thereto, the at least one opening being arranged to respectively seatingly receive the spline-forming member, and the at least one opening being shaped to substantially match an outer periphery of the spline-forming member disposed in the working position so that the at least one opening acts to provide support to the spline-forming member when disposed in the working position.

5. The coupler of claim 1 wherein the locking member is disposed at a common circumferential location as the spline-forming member such that the locking member is seated in an opening defined therein at the radially inward side of the spline-forming member.

6. The coupler of claim 5 wherein the opening in the spline-forming member is shaped to substantially match an outer periphery of the locking member disposed in the locking position so that the opening acts to provide support to the locking member when disposed in the working position.

7. The coupler of claim 5 wherein the locking member is movable between the unlocked and locking positions independently of movement of the spline-forming member between the retracted and working positions.

8. The coupler of claim 1 wherein the control component is carried on the coupling hub for pivotal movement relative thereto between an unlocked position in which the spline-forming member is positionable in the retracted position thereof and a locked position in which the spline-forming member is disposed in the working position, and the control component defines, on a radially inward side thereof relative to the coupling hub, a cam surface arranged to slidingly engage a cam surface on a radially outward side of the spline-forming member to enable displacement of the spline-forming member between the retracted and working positions, the cam surface of the control component comprising a first portion corresponding to the unlocked position and a second portion corresponding to the locked position which is circumferentially adjacent the first portion and located further radially inwardly than the first portion in a direction generally towards the bore.

9. The coupler of claim 8 wherein the cam surface of the spline-forming member extends across only a partial arcuate width of the spline-forming member at the radially outward side thereof.

10. The coupler of claim 9 wherein the cam surface of the spline-forming member extends from a leading circumferential side of the spline-forming member, relative to a direction of pivotal movement of the control component from the unlocked position to the locked position, to a spaced location from an opposite trailing side of the spline-forming member.

11. The coupler of claim 8 wherein the first portion of the cam surface of the control component, which corresponds to the unlocked position thereof, is substantially equal in arcuate width to the cam surface of the spline-forming member.

12. The coupler of claim 8 wherein the second portion of the cam surface of the control component, which corresponds to the locked position thereof, is shorter in arcuate width than the cam surface of the spline-forming member.

13. The coupler of claim 8 wherein the spline-forming member is floatingly seated in each of at least one opening defined by the coupling hub in the peripheral surface of the bore so as to be in communication with the bore, such that, in the unlocked position of the control component, the spline-forming member is free to move between the retracted and working positions.

14. The coupler of claim 8 wherein, when the locking member is disposed at a common circumferential location as the spline-forming member such that the locking member is seated in an opening defined therein at the radially inward side of the spline-forming member, and when the locking member is movable between the unlocked and locking positions independently of movement of the spline-forming member between the retracted and working positions, the locking member defines a cam surface on a radially outward side thereof arranged for sliding engagement with the cam surface of the control component so as to be displaceable thereby between the unlocked and locking positions when the control component is moved between the unlocked and locked positions thereof.

15. The coupler of claim 14 wherein the locking member is located at a circumferentially spaced location from a leading end of the cam surface of the spline-forming member, relative to a direction of pivotal movement of the control component from the unlocked position to the locked position, such that the locking member is displaced by the control component into the locking position after the spline-forming member has been displaced to the working position by the control component.

16. The coupler of claim 14 wherein the spline-forming member and the locking member are sized substantially the same in a radial direction between the cam surfaces at the radially outward sides thereof and radially innermost tips at the radially inward sides thereof.

17. The coupler of claim 14 wherein the locking member is floatingly seated in the opening defined in the spline-forming member, such that, in the unlocked position of the control component, the locking member is free to move between the unlocked and locking positions.

18. The coupler of claim 8 wherein the control component is biased to the locked position.

19. The coupler of claim 18 wherein the control component is biased to the locked position by a biasing member connected at one of the opposite ends in fixed relation to the coupling hub and at another one of the opposite ends in fixed relation to the control component.

20. The coupler of claim 18 wherein the biasing member is arranged to resist compression between its opposite ends such that the biasing member is compressed when the control component is moved from the locked position to the unlocked position.

21. The coupler of claim 18 wherein the control component is arranged to be retained in the unlocked position against biasing to the locked position.

22. The coupler of claim 21 further including a retention device supported on the coupling hub and biased outwardly, relative to a longitudinal axis of the coupling hub, for selectively protruding through an opening in the control component alignable with the retention device in the unlocked position of the control component.

23. The coupler of claim 22 wherein the retention device comprises a protruding portion arranged for passing into the opening in the control component in a blocking state of the retention device and a base portion of the retention device arranged for engaging the radially inward side of the control component when the protruding portion is in said opening.

* * * * *